J. F. & G. E. LOCKWOOD.

Carbureters.

No. 6,004

Reissued Aug. 11, 1874.

Witnesses, Wm. A. Steel
Thomas McIlvain

James F. Lockwood
and George E. Lockwood
by their Attys.
Howson and Son.

BEST AVAILABLE COPY

UNITED STATES PATENT OFFICE.

JAMES F. LOCKWOOD AND GEORGE E. LOCKWOOD, OF ST. LOUIS, MO.

IMPROVEMENT IN CARBURETERS.

Specification forming part of Letters Patent No. 142,545, dated September 2, 1873; reissue No. 6,004, dated August 11, 1874; application filed July 21, 1874.

*To all whom it may concern:*

Be it known that we, JAMES F. LOCKWOOD and GEORGE E. LOCKWOOD, late of Taylorville, county of Christian, State of Illinois, now of St. Louis, Missouri, have invented an Improved Carbureter, of which the following is a specification:

Our invention relates to apparatus for carbureting air and gas, and the objects of our invention are to insure a thorough admixture of the air or gas with the hydrocarbon vapor.

Figure 1:
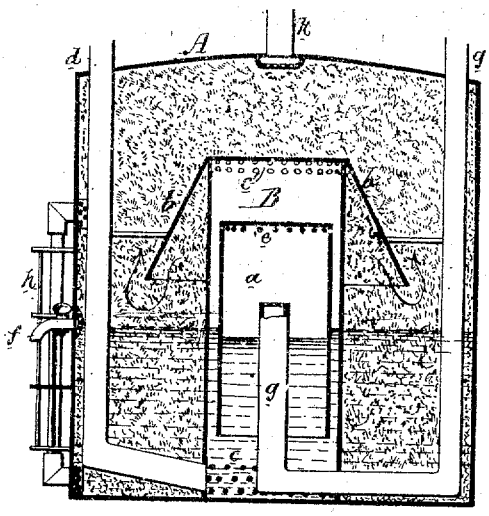
Figure 2:
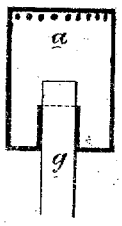

We attain these objects by the use of the apparatus illustrated in the sectional elevation, Figure 1, of the accompanying drawing, Fig. 2 being a sectional view of a modification.

A is the outer casing of the apparatus, and B an internal cylinder secured to the bottom of the said casing, and perforated, at points adjacent to its upper and lower ends, with a number of holes, *c* and *c'*. From the upper end of the cylinder B projects downward and outward, as shown, an inclined hood or deflector, *b*. The gasoline or other liquid hydrocarbon is supplied by a pipe, *d*, communicating with the bottom of the cylinder B, and the gas or air to be carbureted is also admitted into the cylinder B through a pipe, *g*, which extends upward into the said cylinder, as shown, and is capped by a governor or regulator, *a*, perforated with holes *e* at or near the top. The said governor is free to rise and fall within the cylinder B, and may be entirely independent of the pipe *g*, as shown in Fig. 1, or arranged to be guided in its movements by the said pipe, as shown in Fig. 2; but it should be of such height that it may be lowered to its full extent without closing the mouth of the pipe. The space between the casing A and cylinder B, including the space between the latter and the hood or deflector *b*, is filled with sawdust, which readily absorbs and becomes completely saturated with the liquid hydrocarbon admitted by the pipe *d*, the said liquid escaping, through the lower perforations *c* of the cylinder B, into the outer casing A, which is furnished with a gage cock or cocks, *f*, and with an indicator, *h*, by which the height of the liquid within the apparatus may be determined. The gas or air to be carbureted enters the regulator *a*, which rises and falls in accordance with the pressure, and escapes through the perforations *e*, rises to the top of the cylinder B, and escapes thence, through the perforations *c'*, into the sawdust-packed space within the hood *b*. By this hood the air or gas is spread and compelled to pass downward and outward through the mass of saturated sawdust, and finally rise through the latter before it can reach the outlet-pipe *k*. The said hood, in other words, serves as a most effective disseminator of the air or gas, and insures a thorough admixture of the latter with the hydrocarbon vapor given off by the saturated sawdust. The regulator or governor *a*, with its perforations, *e*, at or near the top, prevents pulsations or flickering of the gas at the burners, owing to sudden variations in the pressure of the air or gas supplied to the apparatus, such variations in pressure being compensated for and equilibrium maintained by the rising and falling of the governor.

We claim as our invention—

1. The perforated casing B, arranged in and forming part of a carbureting apparatus, and embedded in absorbent material, in combination with a hood, *b*, whereby the gas from the casing is deflected downward and outward through the mass of material, substantially as set forth.

2. In a carbureting apparatus, the governor or regulator *a*, provided with apertures *e*, in combination with the casing B, having a hood, *b*, and surrounded by absorbent material, as described.

In testimony whereof we have signed our names to this specification in the presence of two subscribing witnesses.

JAMES F. LOCKWOOD.
GEORGE E. LOCKWOOD.

Witnesses:
WM. A. STEEL,
HUBERT HOWSON.